(12) United States Patent
Gilpatrick et al.

(10) Patent No.: US 9,868,582 B2
(45) Date of Patent: Jan. 16, 2018

(54) MATERIAL FOR CARTON, BLANK, OR SUBSTRATE

(71) Applicant: Graphic Packaging International, Inc., Atlanta, GA (US)

(72) Inventors: William Gilpatrick, Broomfield, CO (US); Jeffrey T. Sloat, Broomfield, CO (US)

(73) Assignee: Graphic Packaging International, Inc., Atlanta, GA (US)

( * ) Notice: Subject to any disclaimer, the term of this patent is extended or adjusted under 35 U.S.C. 154(b) by 616 days.

(21) Appl. No.: 13/974,329

(22) Filed: Aug. 23, 2013

(65) Prior Publication Data

US 2014/0054300 A1 Feb. 27, 2014

Related U.S. Application Data

(60) Provisional application No. 61/743,033, filed on Aug. 24, 2012.

(51) Int. Cl.
*B65D 81/38* (2006.01)
*B65D 5/56* (2006.01)
(Continued)

(52) U.S. Cl.
CPC ............ *B65D 81/3858* (2013.01); *B32B 7/12* (2013.01); *B32B 29/005* (2013.01);
(Continued)

(58) Field of Classification Search
CPC ........... B65D 2571/00141; B65D 2571/00148; B65D 2571/0045; B65D 2571/00574; B65D 2571/0066; B65D 2571/00728; B65D 2571/00734; B65D 5/566; B65D 71/36; B65D 81/3858; Y10T 428/13; Y10T 428/1303; B32B 2266/0228;
(Continued)

(56) References Cited

U.S. PATENT DOCUMENTS 2,770,406 A * 11/1956 Lane ................... B65D 5/0281
156/78
3,927,245 A 12/1975 Roth, Jr. et al.
(Continued)

FOREIGN PATENT DOCUMENTS

EP 0234985 A1 9/1987
EP 2 275 352 A1 6/2012
(Continued)

OTHER PUBLICATIONS

Polystyrene Foam Insulation 78 Spray Adhesive, 3M Technical Datasheet of Jun. 2012.*
(Continued)

*Primary Examiner* — Yan Lan
(74) *Attorney, Agent, or Firm* — Womble Bond Dickinson (US) LLP

(57) ABSTRACT

A material for forming a carton for containing a plurality of articles. The material can comprise a plurality of layers comprising a first layer comprising a base and a second layer comprising an insulator. The first layer can be an exterior layer, and the second layer can be a interior layer. The layers of the plurality of layers can be respectively overlapped and attached to one another.

33 Claims, 4 Drawing Sheets

(51) Int. Cl.

| | | |
|---|---|---|
| *B32B 7/12* | (2006.01) | |
| *B32B 37/12* | (2006.01) | |
| *B31B 7/00* | (2006.01) | |
| *B65D 71/36* | (2006.01) | |
| *B32B 29/00* | (2006.01) | |
| *B32B 29/08* | (2006.01) | |

(52) U.S. Cl.
CPC .......... *B32B 29/007* (2013.01); *B32B 29/08* (2013.01); *B65D 5/566* (2013.01); *B65D 71/36* (2013.01); *B32B 2255/12* (2013.01); *B32B 2266/0228* (2013.01); *B32B 2270/00* (2013.01); *B32B 2307/304* (2013.01); *B32B 2439/00* (2013.01); *B32B 2553/00* (2013.01); *B65D 2571/0045* (2013.01); *B65D 2571/0066* (2013.01); *B65D 2571/00141* (2013.01); *B65D 2571/00148* (2013.01); *B65D 2571/00574* (2013.01); *B65D 2571/00728* (2013.01); *B65D 2571/00734* (2013.01); *Y10T 428/13* (2015.01); *Y10T 428/1303* (2015.01)

(58) Field of Classification Search
CPC .............. B32B 29/007; B32B 2255/12; B32B 2270/00; B32B 2307/304; B32B 2439/00; B32B 2553/00; B32B 29/005; B32B 29/08; B32B 7/12; B31B 7/00
USPC ............... 428/34.1, 34.2; 220/592.16, 592.2; 229/5.81; 493/96
See application file for complete search history.

(56) References Cited

U.S. PATENT DOCUMENTS

| | | |
|---|---|---|
| 4,237,171 A | 12/1980 | Laage et al. |
| 4,513,036 A | 4/1985 | Thompson et al. |
| 4,692,327 A | 9/1987 | Takahashi et al. |
| 4,899,925 A | 2/1990 | Bowden et al. |
| 5,050,791 A | 9/1991 | Bowden et al. |
| 5,154,982 A | 10/1992 | Cessna |
| 5,316,212 A * | 5/1994 | Eriksson ................ B65D 5/744 229/125.42 |
| 5,415,910 A | 5/1995 | Knauf |
| 5,520,970 A | 5/1996 | Christensson et al. |
| 5,613,610 A | 3/1997 | Bradford |
| 5,713,824 A | 2/1998 | Drummond et al. |
| 5,716,473 A | 2/1998 | Gordon et al. |
| RE35,830 E | 6/1998 | Sadlier |
| 5,775,577 A | 7/1998 | Titus |
| 5,863,388 A | 1/1999 | Yeh et al. |
| 5,894,046 A | 4/1999 | Kim et al. |
| 5,911,904 A * | 6/1999 | Shih ................ B29C 67/202 106/122 |
| 6,083,580 A | 7/2000 | Finestone et al. |
| 6,110,548 A | 8/2000 | Kinsey |
| 6,237,843 B1 | 5/2001 | Falat et al. |
| 6,296,600 B1 | 10/2001 | Drummond et al. |
| 6,319,590 B1 | 11/2001 | Geddes et al. |
| 6,436,547 B1 | 8/2002 | Toft et al. |
| 6,513,703 B2 | 2/2003 | Becker |
| 6,586,075 B1 | 7/2003 | Mitchell et al. |
| 6,797,397 B1 | 9/2004 | Rehkugler |
| 6,852,381 B2 | 2/2005 | Debraal et al. |
| 6,854,639 B2 | 2/2005 | Walsh |
| 6,857,561 B2 | 2/2005 | Williams |
| 6,881,286 B2 | 4/2005 | Drummond et al. |
| 7,000,825 B2 | 2/2006 | Alexander |
| 7,112,356 B2 | 9/2006 | Nomula et al. |
| 7,241,254 B2 | 7/2007 | Walsh et al. |
| 7,303,116 B2 | 12/2007 | Cervera Cunill |
| 7,348,067 B1 | 3/2008 | Hoffman |
| 7,628,747 B2 | 12/2009 | Kocherga et al. |
| 7,695,772 B2 | 4/2010 | Rasanen et al. |
| 7,703,664 B2 | 4/2010 | Westphal et al. |
| 7,763,380 B2 | 7/2010 | Morita et al. |
| 7,913,511 B2 | 3/2011 | Meyer et al. |
| 8,002,170 B2 | 8/2011 | Dixon-Garrett et al. |
| 8,177,119 B2 | 5/2012 | Littlejohn |
| 8,216,665 B2 | 7/2012 | Farchione |
| 2003/0010817 A1 | 1/2003 | Lingle et al. |
| 2005/0116014 A1 | 6/2005 | Vogt et al. |
| 2006/0011715 A1 | 1/2006 | Bartlett |
| 2008/0029417 A1 | 2/2008 | Begim |
| 2009/0214837 A1 | 8/2009 | Albenice et al. |

FOREIGN PATENT DOCUMENTS

| | | |
|---|---|---|
| GB | 1 583 324 A | 1/1981 |
| JP | 58-117922 | 8/1983 |
| JP | 1-154121 | 10/1989 |
| JP | 4-286641 | 10/1992 |
| JP | 8-47998 | 2/1996 |
| JP | H0847998 * | 2/1996 |
| JP | 10-329284 A | 12/1998 |
| JP | 2000-327050 A | 11/2000 |
| KR | 20-0451372 Y1 | 12/2010 |
| WO | WO 1999/056953 A1 | 11/1999 |
| WO | WO 2002/087994 A1 | 11/2002 |
| WO | WO 2008/094085 A1 | 8/2008 |
| WO | WO 2011/078437 A1 | 6/2011 |

OTHER PUBLICATIONS

Chinese Office Action dated Nov. 4, 2015 for JP 201380043432.4.
International Search Report and Written Opinion for PCT/US2013/056340 dated Nov. 22, 2013.
Supplementary European Search Report for EP 13 83 0348 dated Mar. 17, 2016.
Notification of Reasons for Refusal for Japanese Patent Application No. 2015-528676 dated May 23, 2017, with English translation.

* cited by examiner

MATERIAL FOR CARTON, BLANK, OR SUBSTRATE

CROSS-REFERENCE TO RELATED APPLICATIONS

This application claims the benefit of U.S. Provisional Patent Application No. 61/743,033, filed Aug. 24, 2012.

INCORPORATION BY REFERENCE

The disclosure of U.S. Provisional Patent Application No. 61/743,033, which was filed on Aug. 24, 2012, is hereby incorporated by reference for all purposes as if presented herein in its entirety.

BACKGROUND OF THE DISCLOSURE

This disclosure relates generally to materials for producing cartons and more specifically to a material having insulating and/or protective properties for cartons, such as cartons that enclose a plurality of articles.

SUMMARY OF THE DISCLOSURE

In general, one aspect of the disclosure is directed to a material for forming a carton for containing a plurality of articles. The material can comprise a plurality of layers comprising a first layer comprising a base and a second layer comprising an insulator. The first layer can be an exterior layer, and the second layer can be a interior layer. The layers of the plurality of layers can be respectively overlapped and attached to one another.

In another aspect, the disclosure is generally directed a carton for holding a plurality of articles. The carton can comprise at least one panel at least partially extending around an interior of the carton. At least a portion of the at least one panel can comprise the material described above.

In another aspect, the disclosure is generally directed to a blank for forming a carton for holding the plurality of articles. The blank can comprise at least one panel. At least a portion of the at least one panel can comprise the material described above.

In another aspect, the disclosure is generally directed to a method of forming a carton for holding the plurality of articles. The method can comprise obtaining a blank comprising at least one panel. At least a portion of the blank can comprise the material described above. The method further can comprise forming an interior of the carton at least partially defined by the at least one panel.

In another aspect, the disclosure is generally directed to a material for forming a carton for containing a plurality of articles. The material can comprise a plurality of layers comprising at least a first layer, a second layer, and a third layer. The first layer, the second layer, and the third layer can be respectively overlapped and attached to one another. The first layer can be an outer layer and can comprise a substantially rigid base, and the second layer can be a middle layer and can comprise an insulator. The third layer can be an inner layer and can comprise a generally smooth interior surface for contacting at least one article of the plurality of articles in the carton formed from the material.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

The present disclosure generally relates to cartons that contain articles such as containers, bottles, cans, etc. The articles can be used for packaging food and beverage products, for example. The articles can be made from materials suitable in composition for packaging the particular food or beverage item, and the materials include, but are not limited to, aluminum and/or other metals; glass; plastics such as PET, LDPE, LLDPE, HDPE, PP, PS, PVC, EVOH, and Nylon; and the like, or any combination thereof.

Cartons according to the present disclosure can accommodate articles of any shape. For the purpose of illustration and not for the purpose of limiting the scope of the disclosure, the following detailed description describes beverage containers (e.g., metal beverage cans or beverage bottles) as disposed within the carton embodiments. In this specification, the terms "lower," "bottom," "upper," and "top" indicate orientations determined in relation to fully erected and upright cartons.

Figure 1:
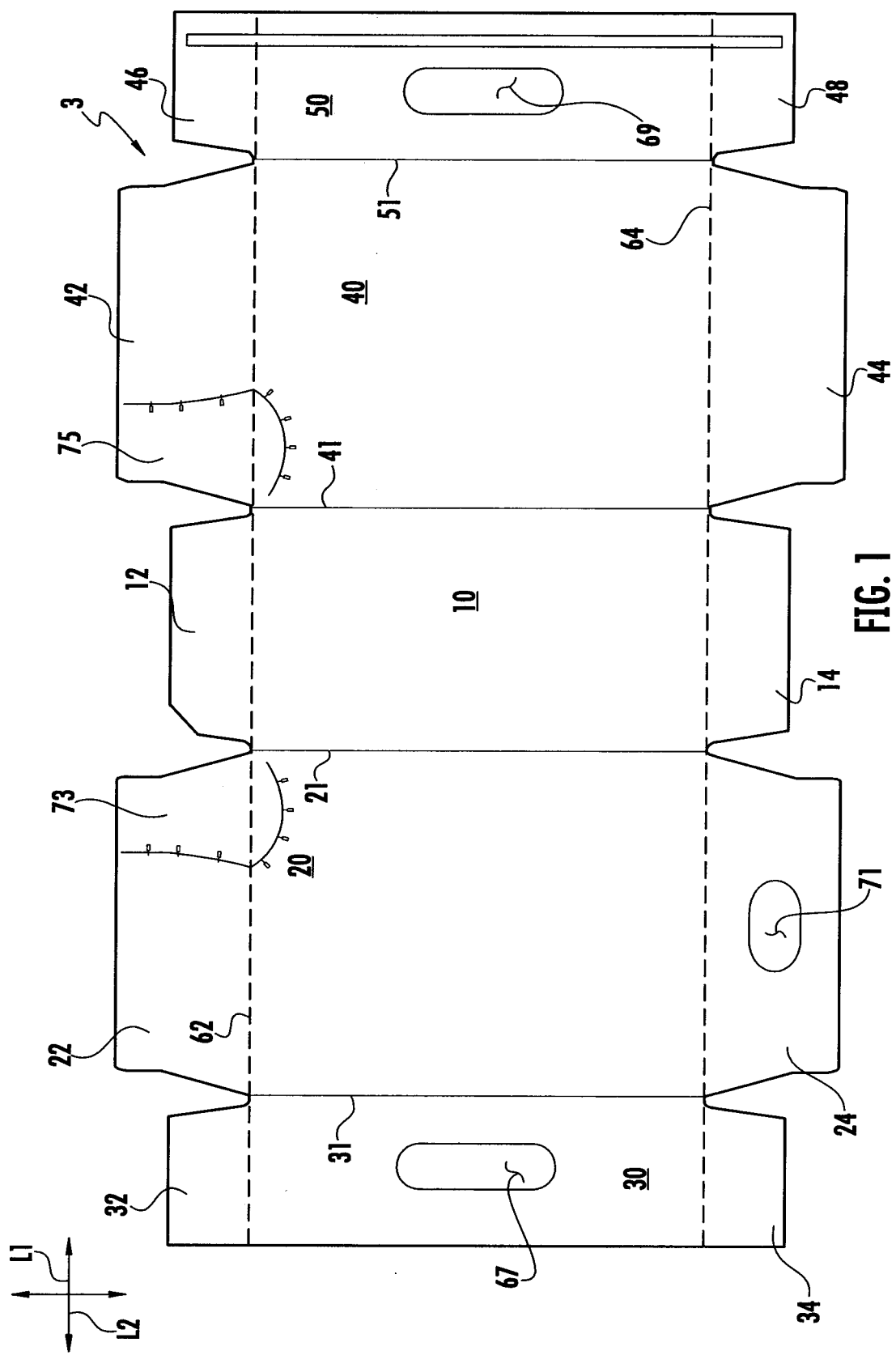
FIG. 1 is a plan view of a blank used to form a carton according to one embodiment of the disclosure.
Figure 2:
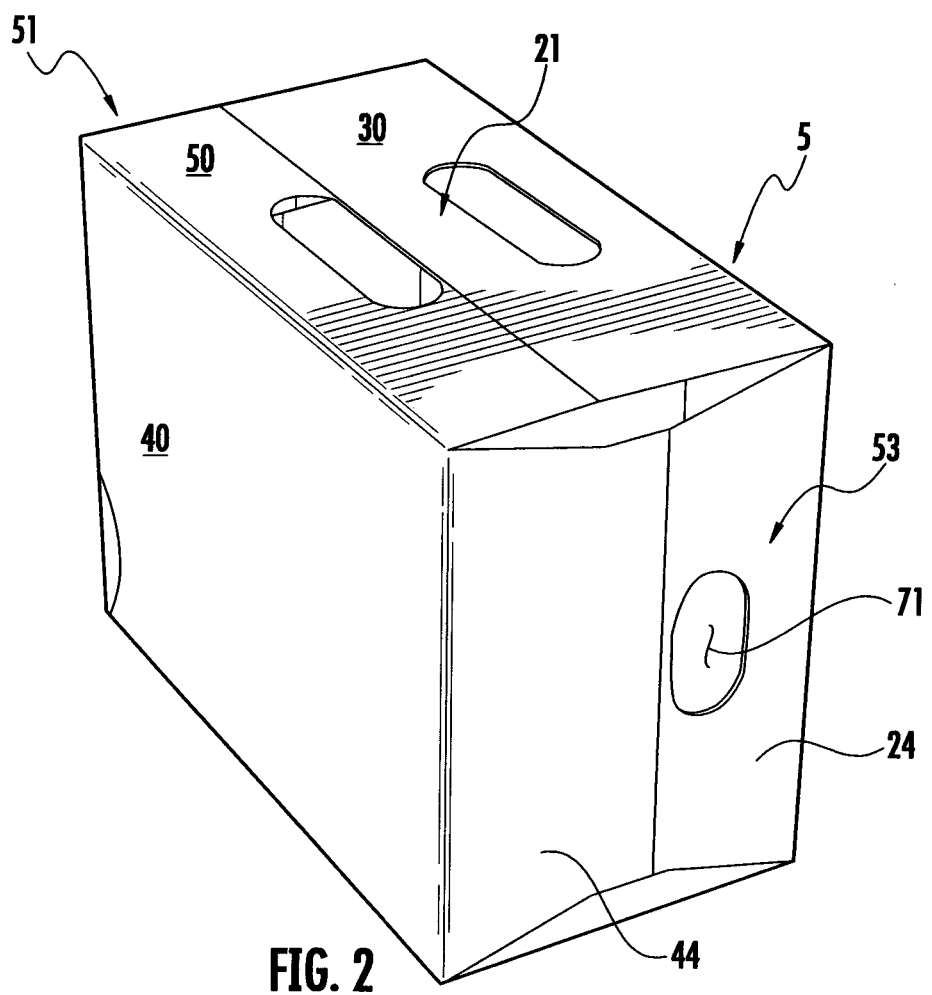
FIG. 2 is an isometric view of the carton according to one embodiment of the disclosure.
Figure 3:
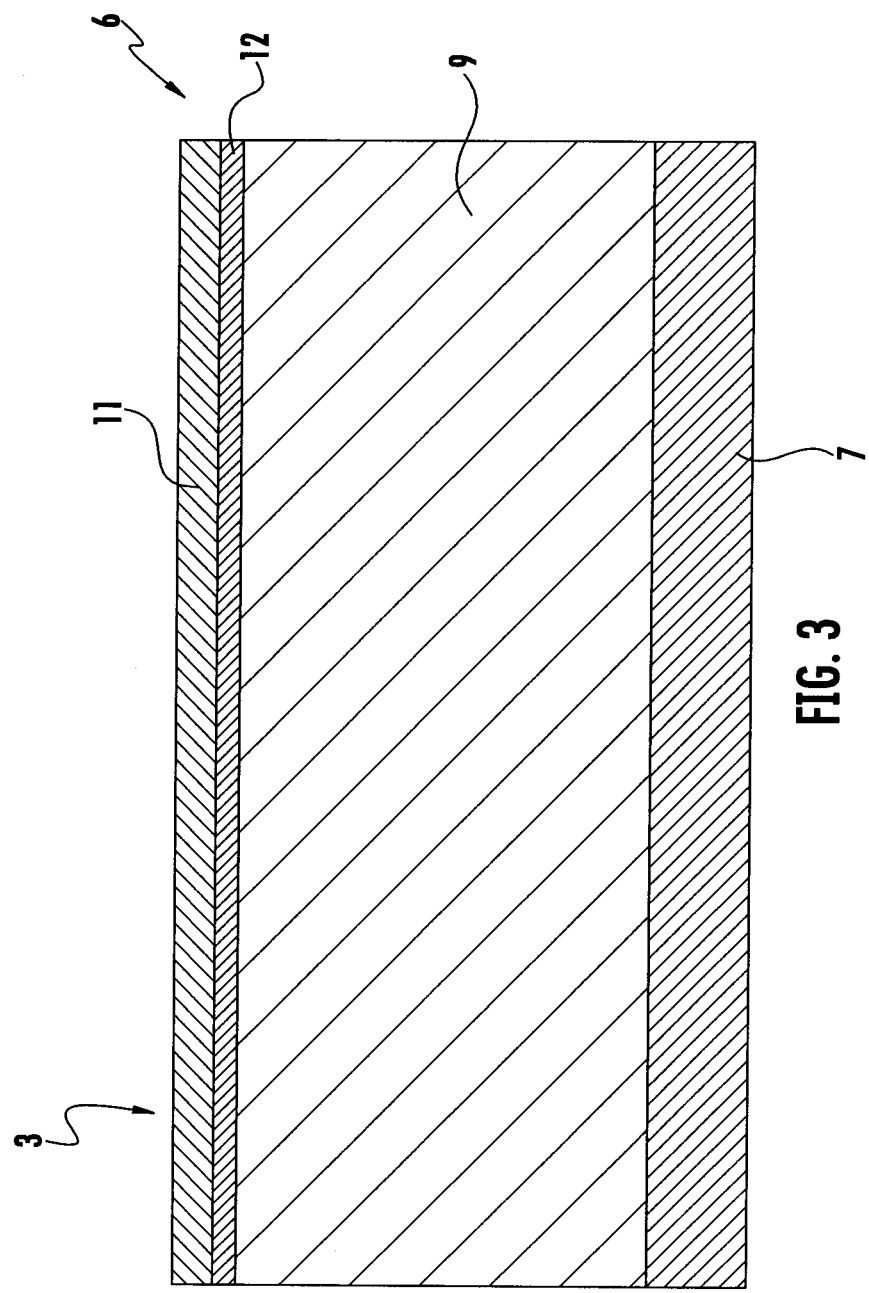
FIG. 3 is a schematic cross-sectional view of a material used to form the blank and carton of FIGS. 1 and 2.

FIG. 1 is a plan view of a blank, generally indicated at 3, used to form a carton 5 (FIG. 2) according to one exemplary embodiment of the disclosure. The carton 5 can be used to house a plurality of articles such as beverage containers. In the illustrated embodiment, the carton 5 is sized to house twelve containers in a single layer in a 3×4 arrangement, but it is understood that the carton 5 may be sized and shaped to hold containers of a different or same quantity in more than one layer and/or in different row/column arrangements (e.g., 3×8, 4×6, 3×6, 1×6, 2×6×2, 3×4×2, 2×9, 2×6, etc.). As shown in the partial cross-section of FIG. 3, the blank comprises a material 6 (e.g., a composite material) that comprises a first (outer) layer 7, a second (middle) layer 9, and a third (inner) layer 11. As will be discussed in more detail below, the first layer 7 can comprise a substantially rigid layer of material (e.g., base material or support material) such as paperboard that provides stiffness and a smooth exterior print surface for the carton 5. In one embodiment, the first layer 7 is a base of the material 6. The second layer 9 can comprise an insulating and/or protecting material (e.g., an insulator) such as foam that maintains the temperature of the containers and also insulates (protects) the containers from breakage. The third layer 11 can comprise a material such as paper or thin paperboard that provides a smooth interior surface for the containers to slide against during filling of the carton 5. The layers 7, 9, 11 could comprise other suitable materials without departing from the disclosure.

In one embodiment, the blank 3 has a longitudinal axis L1 and a lateral axis L2. In the illustrated embodiment, the blank 3 comprises a bottom panel 10 foldably connected to a first side panel 20 at a first lateral fold line 21, a first top panel 30 foldably connected to the first side panel 20 at a second lateral fold line 31, a second side panel 40 foldably connected to the bottom panel 10 at a third lateral fold line 41, and a second top panel 50 foldably connected to the second side panel 40 at a fourth lateral fold line 51. In the illustrated embodiment, the first and second top panels 30, 50 are at least partially overlapped and adhered to form a top wall of the carton 5 having the handle 21 formed therein. Alternatively, a single top panel could form the top wall of the carton 5 without departing from the scope of this disclosure.

The bottom panel 10 is foldably connected to a first bottom end flap 12 and a second bottom end flap 14. The first side panel 20 is foldably connected to a first side end flap 22 and a second side end flap 24. The first top panel 30 is foldably connected to a first top end flap 32 and a second top end flap 34. The second side panel 40 is foldably connected to a first side end flap 42 and a second side end flap 44. The second top panel 50 is foldably connected to a first top end flap 46 and a second top end flap 48.

When the carton 5 is erected, the end flaps 12, 22, 32, 42, 46 close a first end 51 of the carton, and the end flaps 14, 24, 34, 44, 48 close a second end 53 of the carton. In accordance with an alternative embodiment of the present disclosure, different flap arrangements can be used for closing the ends 51, 53 of the carton 5.

The end flaps 12, 22, 32, 42, and 46 extend along a first marginal area of the blank 3, and are foldably connected at a first longitudinal fold line 62 that extends along the length of the blank. The end flaps 14, 24, 34, 44, and 48 extend along a second marginal area of the blank 3, and are foldably connected at a second longitudinal fold line 64 that also extends along the length of the blank. The longitudinal fold lines 62, 64 may be, for example, substantially straight, or offset at one or more locations to account for blank thickness or for other factors.

As shown in FIG. 1, the handle 21 of the carton 5 is formed from features in the first top panel 30 and the second top panel 50. The features of the handle 21 include an elongate handle opening 67 in the first top panel 30 and an elongate handle opening 69 in the second top panel 50. The handle 21 could be formed by features other than the handle openings 67, 69, the handle openings could be otherwise shaped, arranged, and/or configured, or the handle could be omitted without departing from the disclosure.

In the illustrated embodiment, the blank 3 includes display features including an opening 71 in the end flap 24. The blank 3 includes dispenser features including a dispenser panel 73 in the end flap 22 and the first side panel 20 and a dispenser panel 75 in the end flap 42 and the second side panel 40. The blank 3 and/or carton 5 could have other display features, dispenser features, or other features without departing form the disclosure.

EXAMPLES 1-3

E-Flute First Layer

In various embodiments of the disclosure (Examples 1-3), the blank 3 and carton 5 comprises a material 6 that includes a first (outer) layer 7 that is E-flute corrugated fiberboard material that is commercially available from any suitable supplier that is known in the art. In Examples 1-3, the second (middle) layer 9 is a spray adhesive detailed in the chart below and the third (inner) layer 11 is 40# Kraft paper that is commercially available from any suitable supplier that is known in the art. The three layers 7, 9, 11 are laminated together to form the material of the various embodiments of the disclosure. The terms outer and inner are used relative to a formed carton 5 wherein the inner layer 11 would be adjacent the interior of the carton and the outer layer 7 would comprise an exterior surface of the carton that would be suitable for printing product information.

| Example | First Layer | Second Layer | Third Layer |
| --- | --- | --- | --- |
| No. 1 | E-flute fiberboard | 31 mil foam padding spray-adhesive | 40# Kraft paper |
| No. 2 | E-flute fiberboard | 8 mil polystyrene label stock spray-adhesive | 40# Kraft paper |
| No. 3 | E-flute fiberboard | 11 mil polystyrene label stock spray-adhesive | 40# Kraft paper |

EXAMPLES 4-6

Paperboard First Layer

In various embodiments of the disclosure (Examples 4-6), the blank 3 and carton 5 comprises a material 6 that includes a first (outer) layer 7 that is 22 point SUS® paperboard that is commercially available from Graphic Packaging International. In Examples 4-6, the second (middle) layer 9 is a spray adhesive detailed in the chart below and the third (inner) layer 11 is 40# Kraft paper that is commercially available from any suitable supplier that is known in the art. The three layers 7, 9, 11 are laminated together to form the material of the various embodiments of the disclosure.

| Example | First Layer | Second Layer | Third Layer |
| --- | --- | --- | --- |
| No. 4 | 22 point SUS ® Paperboard | 31 mil foam padding spray-adhesive | 40# Kraft paper |
| No. 5 | 22 point SUS ® Paperboard | 8 mil polystyrene label stock spray-adhesive | 40# Kraft paper |
| No. 6 | 22 point SUS ® Paperboard | 11 mil polystyrene label stock spray-adhesive | 40# Kraft paper |

EXAMPLES 7-8

Expandable Second Layer

In various embodiments of the disclosure (Examples 7-8), the blank 3 and carton 5 comprises a material 6 that includes a second (middle) layer 9 that is an expandable coating material such as EXPANCEL® 461 DU 20 dry unexpanded microspheres that is commercially available from AkzoNobel. In Examples 7-8 the first (outer) layer 7 is either 22 point SUS® paperboard as in Example Nos. 4-6, or E-flute corrugated fiberboard as in Example Nos. 1-3. In Examples 7-8, the third (inner) layer 11 is 40# Kraft paper that is commercially available from any suitable supplier that is known in the art. The third layer 11 can be attached to the second layer by an optional fourth layer 12 that can comprise 11 mil of polystyrene label stock spray-adhesive. The four layers 7, 9, 11, 12 are laminated together to form the material of the various embodiments of the disclosure.

| Example | First Layer | Second Layer | Third Layer | Fourth Layer |
|---------|-------------|--------------|-------------|--------------|
| No. 7 | E-flute fiberboard | 1 mil Mayer rod application of Expancel ® 461 DU 20 expandable coating | 40# Kraft paper | 11 mil polystyrene label stock spray-adhesive |
| No. 8 | 22 point SUS ® Paperboard | 1 mil Mayer rod application of Expancel ® 461 DU 20 expandable coating | 40# Kraft paper | 11 mil polystyrene label stock spray-adhesive |

In one embodiment, the foam padding adhesive of Example Nos. 1 and 4 comprises 1/32" perforated foam roll that is commercially available from ULine Shipping Supply Specialists of Pleasant Prairie, Wis., as item No. S-12575P, or any other suitable foam adhesive available from any other suitable manufacturer or supplier. In one embodiment the polystyrene label stock spray adhesive of Example Nos. 2, 3, 5, 6, 7, and 8 comprises a polystyrene label stock material in either an 8 mil or 11 mil thickness that is available from Web Resources International, Inc. of Fairport, N.Y., or any other suitable material available from any other suitable manufacturer or supplier.

Figure 4:
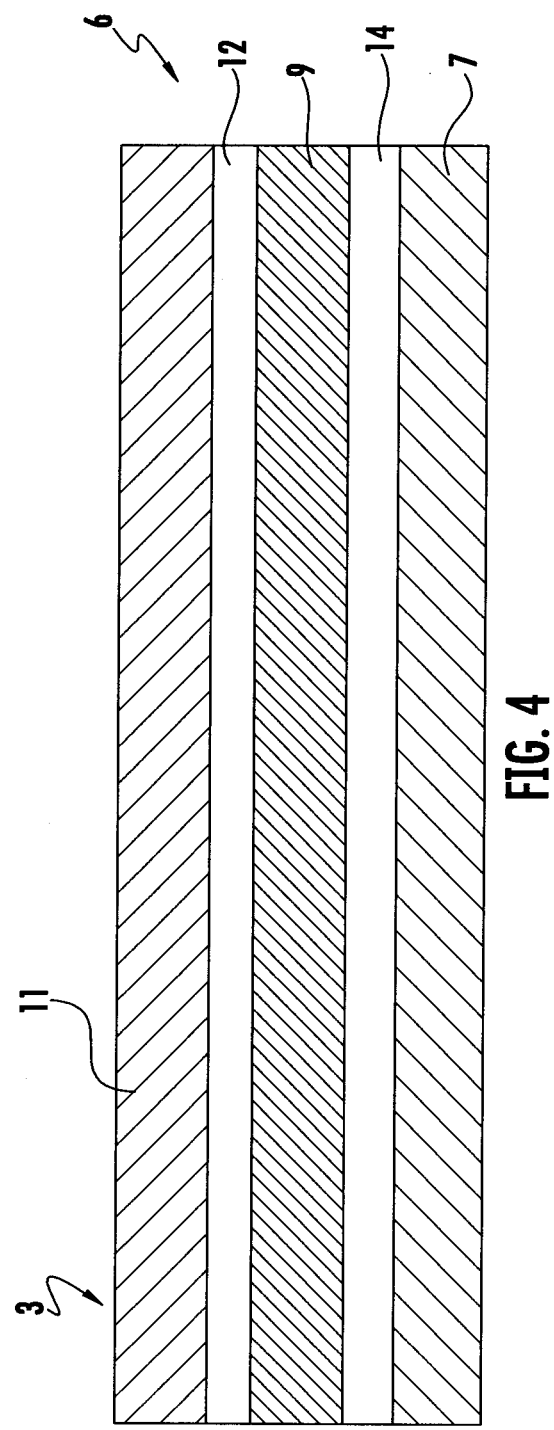
FIG. 4 is a schematic cross-sectional view similar to FIG. 3 but showing an alternative embodiment of the material used to form the blank and carton of FIGS. 1 and 2.

FIG. 4 illustrates an alternative embodiment of the present disclosure with the blank 3 and carton 5 comprising a material 6 comprising five layers, the first (outer) layer 7, second (middle) layer 9, third (inner) layer 11 are identical or similar to the respective layers described above for Examples 1-8. The fourth layer 12 can comprise adhesive as noted above for Examples 7 and 8. In the embodiment of FIG. 4, a fifth layer 14 of adhesive is between the first layer 7 and the second layer 9. In one embodiment, the fifth layer 14 can be polystyrene label stock spray adhesive similar to the material used in Example Nos. 2, 3, 5, 6, 7, or the fifth layer could comprise other material without departing from the scope of the disclosure. In any of the combinations of materials noted above for the first layer 7, second layer 9, and third layer 11, one or both of the fourth layer 12 and fifth layer 14 can be used in the material 6. The fourth layer 12 and the fifth layer 14 can be the same or different materials without departing from the disclosure.

In one embodiment, the layers 7, 9, 11 can be formed into the material 6 by any suitable process (e.g., lamination, extrusion, etc.). One or more of the layers 7, 9, 11 can be attached to an adjacent layer by any suitable adhesive (e.g., adhesive layers 12, 14) or any other suitable attachment mechanism. The material 6 can be formed by any other suitable process and can have any suitable materials without departing from the disclosure.

The material 6 of the present disclosure can be used in a blank 3 or carton 5 that houses a plurality of beverage containers. Alternatively, the material 6 could be used to form a different substrate, blank, carton, other suitable containers, and/or any suitable construct. The material 6 can be a multilayer lamination having an interior layer 9 of insulating material such as foam or other material. The material 6 of the present disclosure provides insulating properties to the carton 5 or blank 3 such that the temperature of the containers in the carton are maintained at a temperature such as when beverage containers are maintained at a cold temperature prior to consumption. Also, the material 6 can have protective properties that protect the containers and prevent breakage or damage of the containers that are packaged in the carton 5. The material can be formed by laminating one or more of the layers 7, 9, 11, 12, 14 of material together by conventional lamination processes or the layers of the material can be formed or attached by other processes without departing from the disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments that are within the scope of the claims. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A material for forming a carton for containing a plurality of articles, the material comprising:
    a plurality of layers comprising a first layer comprising a base comprised of paperboard or fiberboard, a second layer comprising an insulator, a third layer, and at least one layer of adhesive attaching the third layer to the second layer, the first layer being an exterior layer and the second layer being an interior layer disposed between the first layer and the third layer;
    the layers of the plurality of layers being respectively overlapped and attached to one another; and
    the insulator of the second layer is a spray adhesive, wherein the spray adhesive is in direct contact with the paperboard or fiberboard of the first layer, and the spray adhesive is in direct contact with the at least one layer of adhesive.

2. The material of claim 1, wherein the insulator is a temperature insulating material for resisting heat transfer across the second layer of the material.

3. The material of claim 1, wherein the insulator of the second layer comprises a cushioning property for protecting at least one article of the plurality of articles.

4. The material of claim 1, wherein the base is substantially rigid for at least partially supporting the material.

5. The material of claim 1, wherein the base is E-flute fiberboard.

6. The material of claim 1, wherein the spray adhesive is 31 mil foam padding spray-adhesive.

7. The material of claim 1, wherein the third layer comprises a paper material.

8. The material of claim 7, wherein the paper material is Kraft paper or paperboard.

9. The material of claim 1, wherein the third layer is for being positioned in contact with at least one article of the plurality of articles.

10. A carton for holding the plurality of articles, the carton comprising at least one panel at least partially extending around an interior of the carton, at least a portion of the at least one panel comprising the material of claim 1.

11. The carton of claim 10, wherein the base is E-flute fiberboard or 22 point SUS® paperboard.

12. The carton of claim 10, wherein the spray adhesive is 31 mil foam padding spray-adhesive, 8 mil polystyrene label stock spray-adhesive, or 11 mil polystyrene label stock spray-adhesive.

13. The carton of claim 10, wherein the third layer is Kraft paper or paperboard.

14. The carton of claim 10, wherein the third layer is for being positioned in contact with at least one article of the plurality of articles.

15. A blank for forming a carton for holding the plurality of articles, the blank comprising at least one panel, at least a portion of the at least one panel comprising the material of claim 1.

16. The blank of claim 15, wherein the base is E-flute fiberboard or 22 point SUS® paperboard.

17. The blank of claim 15, wherein the spray adhesive is 31 mil foam padding spray-adhesive, 8 mil polystyrene label stock spray-adhesive, or 11 mil polystyrene label stock spray-adhesive.

18. The blank of claim 15, wherein the third layer is Kraft paper or paperboard.

19. The blank of claim 15, wherein the third layer is for being positioned in contact with at least one article of the plurality of articles.

20. A method of forming a carton for holding the plurality of articles, the method comprising:
obtaining a blank comprising at least one panel, at least a portion of the blank comprising the material of claim 1; and
forming an interior of the carton at least partially defined by the at least one panel.

21. The method of claim 20, wherein the spray adhesive is 31 mil foam padding spray-adhesive, 8 mil polystyrene label stock spray-adhesive, or 11 mil polystyrene label stock spray-adhesive.

22. The method of claim 20, wherein the forming the carton comprises positioning the third layer in contact with at least one article of the plurality of articles.

23. The material of claim 1, wherein the spray adhesive is 8 mil polystyrene label stock spray-adhesive.

24. The material of claim 1, wherein the spray adhesive is 11 mil polystyrene label stock spray-adhesive.

25. The material of claim 1, wherein the base is 22 point SUS® paperboard.

26. A material for forming a carton for containing a plurality of articles, the material comprising:
a plurality of layers comprising at least a first layer, a second layer, and a third layer, the first layer, the second layer, and the third layer being respectively overlapped and attached to one another, the third layer attached to the second layer with at least one layer of adhesive;
the first layer is an outer layer and comprises a substantially rigid base comprised of paperboard or fiberboard;
the second layer is a middle layer and comprises an insulator, the insulator consisting of a spray adhesive, the spray adhesive being in direct contact with the paperboard or fiberboard of the first layer, and the spray adhesive being in direct contact with the at least one layer of adhesive; and
the third layer is an inner layer and comprises a generally smooth interior surface for contacting at least one article of the plurality of articles in the carton formed from the material.

27. The material of claim 26, wherein the first layer is for providing a generally smooth exterior surface of the carton formed from the material.

28. The material of claim 26, wherein the first layer comprises a printable surface.

29. The material of claim 26, wherein the base is E-flute fiberboard or 22 point SUS® paperboard.

30. The material of claim 26, wherein the spray adhesive is 31 mil foam padding spray-adhesive, 8 mil polystyrene label stock spray-adhesive, or 11 mil polystyrene label stock spray-adhesive.

31. The material of claim 26, wherein the third layer is Kraft paper or paperboard.

32. A method of forming a material for forming a carton for containing a plurality of articles, the method comprising:
obtaining a base comprised of paperboard or fiberboard;
forming an insulator comprising spraying a spray adhesive onto the base so that the insulator is the spray adhesive and the spray adhesive is in direct contact with the paperboard or fiberboard of the base, wherein the insulator and the base form respective layers that are overlapped and attached to one another, and the base is an exterior layer; and
attaching an interior layer to the insulator with at least one layer of adhesive so that the insulator is disposed between the base and the interior layer and the spray adhesive is in direct contact with the at least one layer of adhesive.

33. The method of claim 32, wherein the interior layer comprises a paper material.

* * * * *